2,892,254
METHOD OF MAKING CAM SHAFTS

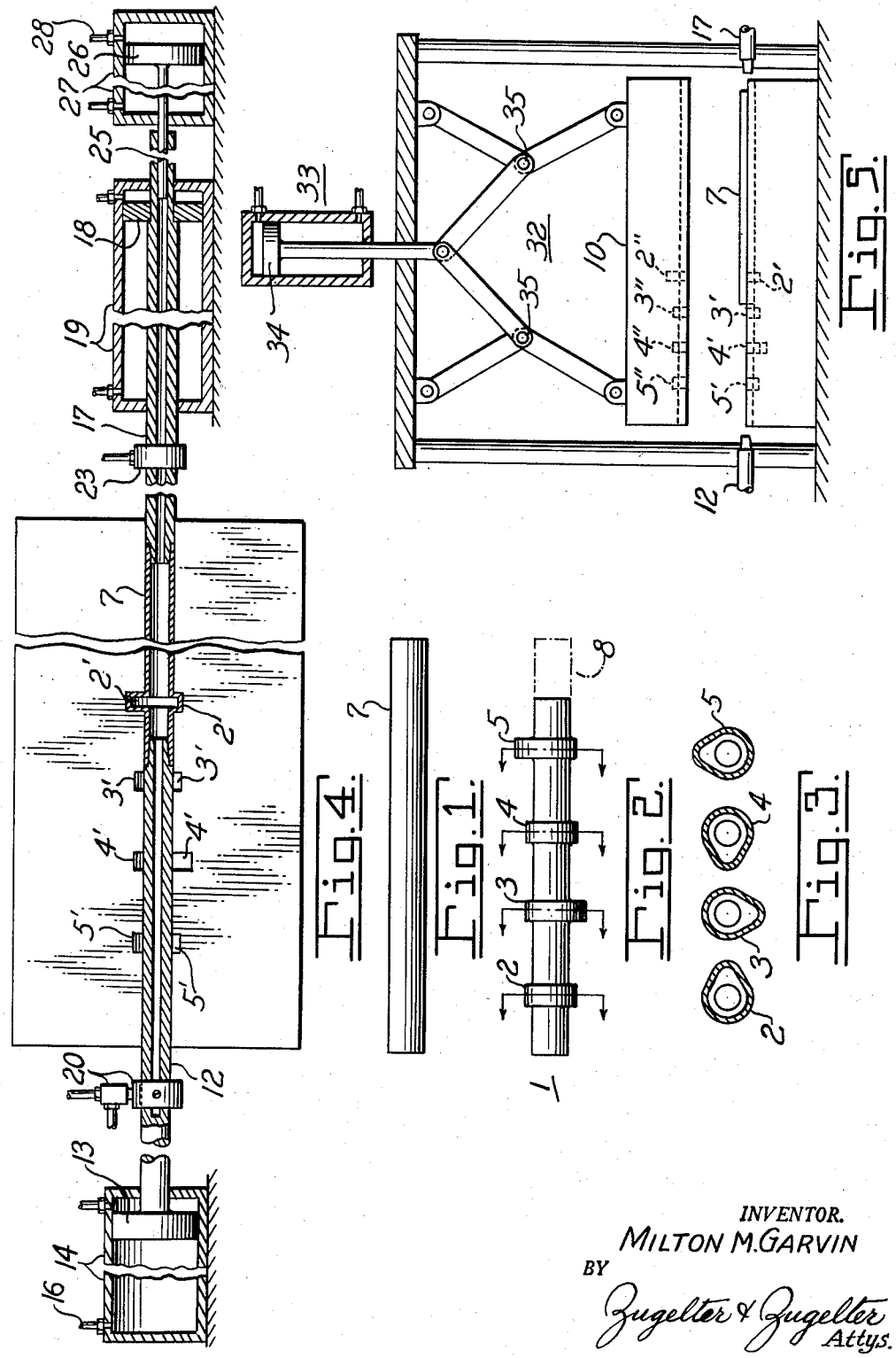

Milton M. Garvin, Cincinnati, Ohio, assignor, by mesne assignments, to American Radiator & Standard Sanitary Corporation, New York, N.Y., a corporation of Delaware Application June 8, 1953, Serial No. 360,118

2 Claims. (Cl. 29—421)

This invention relates to cam shafts, and more particularly, to methods of making cam shafts from hollow metal tubing.

An object of this invention is to provide a novel method for producing a cam shaft that is light and strong, and which is composed of a single piece of hollow, tubular stock.

Another, and more specific, object of the invention is to provide a method of making hollow cam shafts from tubular stock, in which the lobes of the cam shaft are formed by the application of internal pressure to the tube stock, while the same is in a die having cavities conforming to the shape of the lobes.

Other objects of the invention will, in part, be apparent and will, in part, be obvious to those of ordinary skill in the art to which this invention pertains, from the following description and drawings.

In the drawings:

Figure 1 is a view in side elevation of a length of hollow, tubular stock, from which a cam shaft is made in accordance with this invention;

Fig. 2 is a view in side elevation of a cam shaft formed from the blank shown in Fig. 1;

Fig. 3 is a view showing the lobes of the cam shaft in section, the lobes being shown in their angular relationship, one to another;

Fig. 4 is a more or less schematic view in section, of a die and mechanism for forming the lobes on the cam shaft; and Fig. 5 is a more or less diagrammatic view of the die, showing the upper and lower halves thereof, and a mechanism for clamping one die on the other.

In the drawings, and with particular reference to Fig. 2, a cam shaft 1 is shown that is provided with a plurality of cam lobes 2, 3, 4 and 5. For purposes of illustration, the shaft shown in Fig. 2 is provided with four lobes, one pair being for the intake valves of an internal combustion engine, and the other pair for the exhaust valves. The shape of these lobes is shown by the sectional views in Fig. 3. If the cam shaft shown in Fig. 1 were used on a two-cylinder, four-stroke cycle internal combustion engine, lobes 2 and 3 would function to operate the intake and exhaust valves for one cylinder, and lobes 4 and 5 would actuate the exhaust and intake valve of the other cylinder.

The cam shaft shown in Fig. 1 is made from a single piece of hollow, tubular stock 7. The length of the tubular stock 7 is greater than the finished cam shaft shown in Fig. 2, by a length 8 indicated in dot-dash lines in Fig. 2.

The tubular stock 7 may be of steel and of a composition that lends itself readily to drawing, and which may be surface-hardened. The shaft of Figs. 1 and 2, if made of a suitable carbon steel, is easily shaped. The surfaces of the lobes of the cam shaft can be hardened to suit requirements.

The cam shaft 1 may be made in a die, such as shown in Fig. 4. In Fig. 4, only the lower part of the die is illustrated. The lower part of the die is provided with cavities 2', 3', 4' and 5', arranged in accordance with the relative positions of the cam lobes shown in Fig. 3. Cavity lobes 3', 4' and 5' hold the shape of the lobes as formed in 2'. The upper part 10 of the die shown in Fig. 5 is provided with similar and mating cavities 2", 3", 4" and 5".

The cam lobes are formed in the die in a sequence. In the sequence employed, the cam lobe 2 and the succeeding lobes are formed in cavity 2'. To form cam lobe 2, the utbular blank 7 is laid in the runner of the lower die half, as shown in Fig. 4. When so placed, a sealing member 12 is inserted into the left-hand end of the blank 7, as shown. The sealing member is connected to a piston 13, in a cylinder 14. By applying fluid pressure to, or through, part 16 of the cylinder, piston 13 is moved to the right to seat the end of member 12 in the end of the blank 7. Another seal 17 is inserted through a runner in the opposite end of the tube blank.

Seal 17 is connected to a piston 18, in a cylinder 19. When fluid pressure is admitted into the cylinder at the right-hand end of piston 18, the piston moves seal 17 forwardly until it is seated in the end of the tubular blank.

Seal 12 is provided with a valve 20, by means of which fluid may be admitted through a valve 23 in seal member 17, and caused to flow through the tubular blank 7 and the seal member 12, to scavenge air from the tubular blank 7 and fill the same with liquid. When that valve is closed after scavenging the air, the tubular blank is filled with liquid.

The size of piston 18 and the pressure applied to it are such that it will not only force the end of member 17 into the end of the tubular blank sufficiently to seal the joint against leakage, but will also feed a length of tubular stock inwardly of the die, while a cam lobe is being formed in lobe cavity 2'.

When the seals have been seated as above described and the upper die 10 has been closed on the lower one, bulging pressure is supplied to the liquid in the tubular blank 7. This is accomplished by means of a ram 25, that operates in the hollow of seal 17. The ram is actuated by a piston 26, disposed in a cylinder 27. Pressure for actuating piston 26 and developing the bulging pressure is admitted to cylinder 27 through an inlet port 28. As ram 25 moves forwardly to force liquid into the tubular blank, the pressure builds up sufficiently to force metal into cavity 2' and form lobe 2. As lobe 2 is being formed, pressure may be applied to piston 18 to force metal into the cavity to thereby prevent undue thinning of the walls of lobe 2.

When cam lobe 2 has been formed, the seals are withdrawn from the ends of the tube blanks 7, the die is opened and the tubular blank is removed from the die. Blank 7 is then advanced to the left, as seen in Fig. 4, until lobe 2 lies in die cavity 3'. The shape of lobe 2 is retained by cavity 3', while lobe 3 is being formed.

The operation just described, for the formation of lobes 2 and 3, is repeated to form lobe 4. The die is again opened as in the preceding step, and the tubular blank advanced, until lobes 2 and 3 lie in die cavities 4' and 3', respectively, which hold their shape as lobe 4 is being formed. The same procedure is then followed in the forming of lobe 5. While lobe 5 is being formed, cam lobes 2, 3 and 4 lie in, and their shape retained by, die cavities 5', 4' and 3', respectively. As shown by the drawings, the angular relationship of cavities 5', 4' and 3', with respect to cavity 2', is such that the cam lobes, when finished, will have the proper angular relationship to each other. After forming the lobes of the shaft, they may be surface-hardened by any appropriate known process for that purpose.

While a cam shaft is shown having only four lobes, it will be apparent that a cam shaft having a larger number of pairs of cam lobes may be made in accordance with the procedure above described.

The die mechanism illustrated in Fig. 5 is purely schematic. The upper die half is actuated by a toggle mechanism 32, and a power cylinder 33. The die, when open, is in the position shown in Fig. 5. By moving the piston 34 in the power cylinder downwardly, the toggle mechanism is actuated towards a straight position, at which time the upper die half 10 will have been seated on the lower die half. By keeping pressure on the piston 34, the knees 35 of the toggles are held rigid, and the die is held firmly in place.

Having thus described the invention, it will be apparent to those skilled in this art, that various changes may be made in the illustrated embodiments of the invention, without departing from either the spirit or the scope of the invention.

Therefore, what is claimed as new and desired to be secured by Letters Patent is:

1. A method of forming a hollow cam shaft having a plurality of hollow lobes and a plurality of axially aligned hollow shaft portions interconnecting said lobes, said method comprising the steps of confining all but a first predetermined portion of a hollow tube, applying hydraulic pressure to substantially the entire interior of said tube, whereby said unconfined portion expands, controlling the expansion of said last named portion so that it assumes the shape of a first radially extending cam lobe, thereafter confining said first lobe and all but a second predetermined portion of said tube, applying hydraulic pressure to substantially the entire interior of said tube, whereby said second portion is expanded to form a second lobe and any misalignment of said shaft portion between said lobes is corrected, and thereafter repeating the above steps until the desired number of lobes have been formed.

2. A method of forming a hollow cam shaft having a plurality of hollow lobes angularly displaced relative to one another, and a plurality of axially aligned hollow shaft portions interconnecting said lobes, said method comprising the steps of placing a hollow tube in a confining means having a lobe forming cavity in registry with a predetermined portion of said tube, applying hydraulic pressure to substantially the entire interior of said tube whereby said predetermined portion expands into said lobe forming cavity to form a first lobe, shifting said pipe longitudinally and rotating said tube angularly to bring said first lobe into registry with a lobe receiving cavity, whereby said tube is indexed to bring a second predetermined portion of said tube into registry with said lobe forming cavity, confining all of said tube except said second portion, applying hydraulic pressure to substantially the entire interior of said tube, whereby said second portion is expanded into said lobe forming cavity and any misalignment of said shaft portion between said first lobe and said second portion is corrected, controlling the expansion of said second named portion to form a second lobe and thereafter, repeating the above steps until the number of required lobes have been formed.

References Cited in the file of this patent
UNITED STATES PATENTS

| Number | Name | Date |
|---|---|---|
| 1,390,949 | Yassendorf | Sept. 13, 1921 |
| 1,879,663 | Dreyer | Sept. 27, 1932 |
| 1,886,831 | Murray | Nov. 8, 1932 |
| 2,044,379 | Brennan | June 16, 1936 |
| 2,203,868 | Gray et al. | June 11, 1940 |
| 2,307,926 | Griffith | Jan. 12, 1943 |
| 2,552,724 | Lang | May 15, 1951 |
| 2,707,820 | Reynolds | May 10, 1955 |
| 2,713,314 | Leuthesser et al. | July 19, 1955 |
| 2,799,084 | Debor | July 16, 1957 |